US008641921B2

(12) United States Patent
Gibot et al.

(10) Patent No.: US 8,641,921 B2
(45) Date of Patent: Feb. 4, 2014

(54) ROOM TEMPERATURE SINGLE PHASE LI INSERTION/EXTRACTION MATERIAL FOR USE IN LI-BASED BATTERY (75) Inventors: Pierre Gibot, Amiens (FR); Christian Masquelier, Boves (FR); Jean-Marie Tarascon, Mennecy (FR); Stephane Levasseur, Brussels (BE); Philippe Carlach, Antwerp (BE)

(73) Assignees: Umicore, Brussels (BE); Centre National de la Recherche Scientifique, Paris-Cedex (FR)

( * ) Notice: Subject to any disclaimer, the term of this patent is extended or adjusted under 35 U.S.C. 154(b) by 848 days.

(21) Appl. No.: 12/530,846

(22) PCT Filed: Mar. 19, 2008

(86) PCT No.: PCT/EP2008/002195
§ 371 (c)(1),
(2), (4) Date: Nov. 12, 2009

(87) PCT Pub. No.: WO2008/113570
PCT Pub. Date: Sep. 25, 2008

(65) Prior Publication Data
US 2010/0086852 A1 Apr. 8, 2010

Related U.S. Application Data (60) Provisional application No. 60/907,732, filed on Apr. 16, 2007.

(30) Foreign Application Priority Data

Mar. 19, 2007 (EP) ..................................... 07290328

(51) Int. Cl.
H01M 4/88 (2006.01)
H01M 4/02 (2006.01)
H01M 4/00 (2006.01)
B32B 15/02 (2006.01)

(52) U.S. Cl.
USPC ........ 252/182.1; 429/209; 429/221; 252/506; 428/402

(58) Field of Classification Search
None
See application file for complete search history.

(56) References Cited

U.S. PATENT DOCUMENTS

| | | | |
|---|---|---|---|
| 2,836,487 A | 5/1958 | Fastje et al. | |
| 2,932,566 A | 4/1960 | Lumsden | |
| 3,721,547 A | 3/1973 | Dvorak | |
| 3,756,804 A | 9/1973 | Stevenson | |
| 3,830,639 A | 8/1974 | Evans et al. | |
| 4,072,503 A | 2/1978 | Petterson et al. | |
| 4,248,624 A | 2/1981 | Novoa et al. | |
| 4,415,356 A | 11/1983 | Victorovich et al. | |
| 4,416,640 A | 11/1983 | Wilkomirsky et al. | |
| 4,519,836 A | 5/1985 | Sychev et al. | |
| 4,521,245 A | 6/1985 | Yarygin et al. | |
| 4,571,260 A | 2/1986 | Johansson et al. | |
| 5,199,974 A | 4/1993 | Fugleberg | |
| 5,256,186 A | 10/1993 | Player et al. | |
| 5,282,881 A | 2/1994 | Baldock et al. | |
| 5,372,630 A | 12/1994 | Foo et al. | |
| 5,910,382 A | 6/1999 | Goodenough et al. | |
| 5,922,261 A | 7/1999 | Ford, Jr. | |
| 5,942,023 A | 8/1999 | Bitler et al. | |
| 6,379,421 B1 | 4/2002 | Salinas-Fernandez et al. | |
| 6,749,967 B2 | 6/2004 | Li et al. | |
| 7,390,472 B1 | 6/2008 | Singhal et al. | |
| 7,597,740 B2 | 10/2009 | Van Camp et al. | |
| 7,771,628 B2 | 8/2010 | Barker et al. | |
| 2002/0192137 A1 | 12/2002 | Chaloner-Gill et al. | |
| 2003/0215718 A1 | 11/2003 | Huang et al. | |
| 2004/0033360 A1 | 2/2004 | Armand et al. | |
| 2004/0151649 A1 | 8/2004 | Hemmer et al. | |
| 2004/0175614 A1 | 9/2004 | Wurm et al. | |
| 2004/0197654 A1 | 10/2004 | Barker et al. | |
| 2006/0035148 A1 | 2/2006 | Balaya et al. | |
| 2006/0035150 A1 | 2/2006 | Audemer et al. | |
| 2007/0031732 A1 | 2/2007 | Chiang et al. | |
| 2008/0241690 A1 | 10/2008 | Delacourt et al. | |
| 2010/0086852 A1 | 4/2010 | Gibot et al. | |

FOREIGN PATENT DOCUMENTS

| | | |
|---|---|---|
| GB | 2094772 | 9/1982 |
| JP | 53070005 | 6/1978 |
| JP | 2004079276 | 3/2004 |

(Continued)

OTHER PUBLICATIONS

Amine et al., "Olivine $LiCoPO_4$ as 4.8 V Electrode Material for Lithium Batteries," Electrochemical and Solid-State Letters, vol. 3, No. 4, (2000), pp. 178-179.

(Continued)

Primary Examiner — Milton I Cano
Assistant Examiner — Sarah A Slifka
(74) Attorney, Agent, or Firm — Brinks Gilson & Lione (57) ABSTRACT The invention relates to active materials for the manufacture of Li-based batteries. A crystalline nanometric powdered material with formula $Li_x(M, M')PO_4$, in particular $Li_xFePO_4$ (0≤x≤1), is disclosed, exhibiting single phase Li insertion/extraction mechanism at room temperature when used as positive electrode material in Li-based batteries. Compared to current $LiFePO_4$, the novel material results in smooth, sloping charge/discharge voltage curve greatly simplifying the monitoring of the state of charge of the batteries. The coexistence of mixed valence states for Fe (i.e. $Fe^{III}VFe^{II}$) is believed to increase the electronic conductivity in the room temperature single phase $Li_xFePO_4$ material, compared to state of the art two-phase materials. This, together with the nanometric size of the particles and their sharp monomodal size distribution, contributes to the exceptional high-rate capability demonstrated in batteries.

16 Claims, 8 Drawing Sheets (56) References Cited

FOREIGN PATENT DOCUMENTS

| JP | 2004269470 | 9/2004 |
|---|---|---|
| KR | 2006025842 | 3/2006 |
| SU | 1048810 | 7/1989 |
| WO | WO 9836102 | 8/1998 |
| WO | WO 02083555 | 10/2002 |
| WO | WO 02099913 | 12/2002 |
| WO | WO 2004/001881 | 12/2003 |
| WO | WO 2004/056702 | 7/2004 |
| WO | WO 2005051840 | 6/2005 |
| WO | WO 2006105848 | 10/2006 |
| WO | WO 2007/000251 | 1/2007 |
| WO | WO 2008018633 | 2/2008 |
| WO | WO 2008/077447 | 7/2008 |
| WO | WO 2008/077448 | 7/2008 |
| WO | WO 2008077447 | 7/2008 |
| WO | WO 2008077448 | 7/2008 |
| WO | WO 2008113570 | 9/2008 |

OTHER PUBLICATIONS

Arnold et al., "Fine-Particle Lithium Iron Phosphate LiFePO$_4$ Synthesized by a New Low-Cost Aqueous Precipitation Technique," Journal of Power Sources, vol. 119-121, (2003), pp. 247-251.

Arumugan et al., "Synthesis and Electrochemical Characterizations of Nano-Crystalline LiFePO$_4$ and Mg-Doped LiFePO$_4$ Cathode Materials for Rechargeable Lithium-Ion Batteries," J Solid State Electrochem, vol. 13, (2009), pp. 301-307.

Chen et al., "Reducing Carbon in LiFePO$_4$/C Composite Electrodes to Maximize Specific Energy, Volumetric Energy, and Tap Density," Journal of the Electrochemical Society, vol. 149, No. 9, (2002), pp. A1184-A1189.

Extended European Search Report, issued in EP06292048.3-1218, dated Apr. 25, 2007.

Final Office Action, dated Sep. 3, 2010, issued in co-pending, commonly assigned U.S. Appl. No. 12/519,853.

Franger et al., "Comparison Between Different LiFePO$_4$ Synthesis Routes and Their Influence on its Physico-Chemical Properties," Journal of Power Sources, vols. 119-121, (2003), pp. 252-257.

International Preliminary Report on Patentability, issued in PCT/EP2007/009969, dated Jul. 2, 2009.

International Preliminary Report on Patentability, issued in PCT/EP2007/009968, dated Jul. 2, 2009.

International Search Report, issued in PCT/EP2007/009969, dated Mar. 26, 2008.

International Search Report, issued in PCT/EP2007/009968, dated Apr. 14, 2008.

Kwon et al., "Enhanced Electrochemical Performance of Mesoparticulate LiMnPO$_4$ for Lithium Ion Batteries," Electrochemical and Solid-State Letters, vol. 9, No. 6, (2006), pp. A277-A280.

Li et al., "LiMnPO$_4$ as the Cathode for Lithium Batteries," Electrochemical and Solid-State Letters, vol. 5, No. 6, (2002), pp. A135-A137.

Lloris et al., "Improvement of the Electrochemical Performance of LiCoPO$_4$ 5 V Material Using a Novel Synthesis Procedure," Electrochemical and Solid-State Letters, vol. 5, No. 10, (2002), pp. A234-A237.

Ma et al., "Electrochemical Performance of Nanocrystalline LiMPO$_4$ Thin-Films Prepared by Electrostatic Spray Deposition," Journal of Power Sources, vol. 148, (2005), pp. 66-71.

Mi et al., "Synthesis and Performance of LiMn$_{0.6}$Fe$_{0.4}$PO$_4$/Nano-Carbon Webs Composite Cathode," Materials Science and Engineering B, vol. 129, (2006), pp. 8-13.

Nuspl et al., "Ultrafine LiFePO$_4$ Synthisized by an Optimized Hydrothermal Process," Abs. 293, IMLB 12 Meeting, (2004).

Office Action, dated Nov. 3, 2010, issued in co-pending, commonly assigned U.S. Appl. No. 12/825,682.

Office Action, dated Apr. 26, 2010, issued in co-pending, commonly assigned U.S. Appl. No. 12/519,853.

Office Action, dated Feb. 8, 2011, issued in co-pending, commonly assigned U.S. Appl. No. 12/519,853.

Okada et al., "Cathode Properties of Phospho-Olivine LiMPO$_4$ for Lithium Secondary Batteries," Journal of Power Sources, vols. 97-98, (2001), pp. 430-432.

Wang et al., "Extraction of Layerwise Conductivities in Carbon-Enhanced, Multilayered LiFePO4 Cathodes," Journal of the Electrochemical Society, vol. 152, No. 5, (2005), pp. A1001-A1010.

Yonemura et al., "Comparative Kinetic Study of Olivine Li$_x$MPO$_4$ (M=Fe, Mn)," Journal of the Electrochemical Society, vol. 151, No. 9, (2004), pp. A1352-A1356.

Delacourt et al., "Toward Understanding of Electrical Limitations (Electronic, Ionic) in LiMPO$_4$ (M=Fe, Mn) Electrode Materials," Journal of the Electrochemical Society, vol. 152, No. 5, (2005), pp. A913-A921.

Delacourt et al., "The Existence of a Temperature-Driven Solid Solution in Li$_x$FePO$_4$ for $0 \leq x \leq 1$," Nature Publishing Group, (2005), pp. 1-7.

Dodd et al., "Phase Diagram of Li$_x$FePO$_4$," Electrochemical and Solid-State Letters, vol. 9, No. 3, (2006), pp. A151-A155.

Striebel et al., "Comparison of LiFePO$_4$ from Different Sources," Journal of the Electrochemical Society, vol. 152, No. 4, (2005), pp. A664-A670.

Extended European Search Report, issued in EP07290328.9-2119, dated Sep. 20, 2007.

Padhi et al., "Phospho-Olivines as Positive-Electrode Materials for Rechargeable Lithium Batteries," J. Electrochemical Soc., vol. 144, No. 4, (Apr. 1997), pp. 1188-1194.

Delacourt et al., "Low Temperature Preparation of Optimized Phosphates for Li-Battery Applications," Solid State Ionics, vol. 173, (2004), pp. 113-118.

Yamada et al., "Phase Change in Li$_x$FePO$_4$," Electrochemical and Solid-State Letters, vol. 8, No. 8, (2005), pp. A409-A413.

International Search Report, issued in PCT/EP2008/002195, dated Aug. 14, 2008.

International Preliminary Report on Patentability, issued in PCT/EP2008/002195, dated Jun. 23, 2009.

Barnhart, ed. American College Dictionary, New York, NY, (1970), p. 1342.

Delacourt et al., "One-Step Low-Temperature Route for the Preparation of Electrochemically Active LiMnPO$_4$ Powders," Chem. Mater., vol. 16, (2004), pp. 93-99.

De Schepper, "Liquid-Liquid Extraction of Germanium by LIX-63," Database Compendex, Database Accession No. EIX78110005759, Sep. 26, 1977. (XP-002260042).

Esna-Ashari et al., "Smelting Reactor for Recovering Zinc from Industrial Low Zinc Bearing Residues," Erzmetall, Reiderer Verlag GmbH, Stuttgart, Germany, vol. 53, No. 6, (2000), pp. 373-384. (XP 000959985).

Heard et al., "Recycling of Zinc-Bearing Residues with the PRIMUS Process," Iron Steelmaker I and SM, vol. 30, No. 5, (Apr. 2003), pp. 55-60. (XP 009020220).

International Preliminary Report on Patentability, issued in commonly owned International Application No. PCT/EP2004/006238, dated Oct. 7, 2005.

International Preliminary Report on Patentability, issued in corresponding International Application No. PCT/EP2004/009685, dated Jan. 12, 2006.

International Search Report and Written Opinion, issued in commonly owned International Application No. PCT/EP2004/006238, dated Sep. 23, 2004.

International Search Report and Written Opinion, issued in corresponding International Application No. PCT/EP2004/009685, dated Jan. 21, 2005.

Jak et al., "Phase Equilibria and Thermodynamics of Zinc Fuming Slags," Canadian Metallurgical Quarterly, vol. 41, No. 2, (2002), pp. 163-174.

XP-002310971 "Extn. of Valuable Components for Metallurgical Slags—by Treatment of Slag Stream with Hot Neutral or Reducing Gas Heated in Arc Plasmatron," Derwent Publications Ltd., Section Ch, Week 198223, Aug. 15, 1981.

ROOM TEMPERATURE SINGLE PHASE LI INSERTION/EXTRACTION MATERIAL FOR USE IN LI-BASED BATTERY

This application is a National Stage application of International Application No. PCT/EP2008/002195, filed Mar. 19, 2008, which claims priority to European Patent Application No. 07290328.9, filed Mar. 19, 2007, and U.S. Provisional Patent Application No. 60/907,732, filed Apr. 16, 2007, the entire contents of which are hereby incorporated by reference.

This invention relates to crystalline nanometric materials, in particular to $Li_xFePO_4$ ($0 \leq x \leq 1$) powder, showing an unusual single phase Li insertion/extraction mechanism at room temperature (25° C.) when used as positive electrode material in Li-based batteries.

Some years after the original work from Padhi et al. (J. Electrochem. Soc., 144, 1188 (1997)) was published, phospho-olivines $LiMPO_4$ (with M is Fe, Mn, Co ...) now appear to be potential candidates as positive electrode materials for rechargeable lithium batteries. Thanks to smart processing, e.g. by carbon coating, $Li^+$ ions may be extracted out of $LiFePO_4$ leading to room-temperature capacities of about 160 mAh/g, i.e. close to the theoretical capacity of 170 mAh/g. The room-temperature Li insertion/extraction is well known, e.g. from WO2004/001881, to proceed at 3.45 V vs. $Li^+$/Li, in a two-phase reaction between $LiFePO_4$ and $FePO_4$.

Note that, as raised by Striebel et al. (J. Electrochem. Soc., 152, A664 (2005)) while making a compilation of tests of various carbon-coated $LiFePO_4$ compounds, even if the matrix conductivity has been improved by coating, the battery developer would welcome so-far inexistent compounds having a primary particle size in the 50-100 nm range and, overall, attempts should be made to minimise the particle size distribution, in order to yield better power efficiency.

WO2004/056702 and WO2007/00251 teach techniques to decrease the average particle size down to the 140-150 nm range. Nevertheless, it is admitted by the skilled persons that decreasing the particle size below these values would allow a further increase of the high-power performances.

Various authors, e.g. Yamada et al. (Electrochem. Solid State Let., 8, A409 (2005)) and in US2007/0031732, have shown that reducing the particle size would allow some deviation from the well described two-phase Li insertion/extraction behaviour. Indeed, materials showing small particle sizes exhibit some limited solid solution (i.e. single phase) domains at room temperature, namely of Li-poor $Li_xFePO_4$ (x<0.15) and of Li-rich $Li_yFePO_4$ (y>0.85). Although it was recognized that the x and y limits, which represent the boundaries of the two-phase domain, may depend upon both the particle size and the particular conditions of the synthesis, materials with a significantly broader single phase domain were never obtained.

The recent discovery of a complete single phase $Li_xFePO_4$ ($0 \leq x \leq 1$) solid solution at temperatures of around 350° C. has spurred great interest in assessing its role in the performance of $LiFePO_4$ as cathode material for Li-ion batteries. Nevertheless, whatever the x values, it was clearly demonstrated that the solid solution could not be stabilised at room temperature, thus making it of limited practical interest as standard battery material (Delacourt et al., Nature Mat., 4, 254 (2005); Dodd et al., Electrochem. Solid State Let., 9, A151 (2006)).

The most obvious distinction between a single phase and a two-phase insertion/extraction mechanism is that the equilibrium potential (EMF) of a single phase system is composition-dependent, while that of a two-phase system is constant over the entire composition range. A single phase electrode will thus show a sloping voltage curve during charge or discharge cycles: this is welcomed by the battery manufacturer as it enables monitoring of the state of charge at reduced cost compared to systems presenting a flat voltage curve.

Also, it is now admitted that in the two-phase system $LiFePO_4/FePO_4$, both end members present very limited electronic conductivity, and that no mixed valence state is present either in $FePO_4$ ($Fe^{(III)}$) or in $LiFePO_4$ ($Fe^{(II)}$) (Delacourt et al., Electrochem. Soc., 152, A913 (2005). As emphasized by Chiang et al. in US2007/0031732, greater population of both Fe species at every point within the deintercalation range could provide a higher electronic conductivity for the material. A good material conductivity is particularly advantageous with respect to high drain applications.

The same quest for enhanced material conductivity applies to similar active materials for Li batteries, such as $LiMnPO_4$ and in $Li(Fe,M)PO_4$ (with M is Co and/or Mn), as reported respectively in the patent applications WO2008-77447 and WO2008-77448.

Further, in US2006/0035150 A1, for the preparation of coated $LiFePO_4$, sources of Li, Fe and phosphate are dissolved in an aqueous solution together with a polycarboxylic acid and a polyhydric alcohol. Upon water evaporation, poly-esterification occurs while a mixed precipitate is formed containing Li, Fe and phosphate. The resin-encapsulated mixture is then heat treated at 700° C. in a reducing atmosphere.

In WO2007/000251 A1, a direct precipitation process is described for preparing crystalline $LiFePO_4$ powder, comprising the steps of:
  providing a water-based mixture having at a pH between 6 and 10, containing a water-miscible boiling point elevation additive, and $Li^{(I)}$, $Fe^{(II)}$ and $P^{(V)}$ as precursor components;
  heating said water-based mixture to a temperature less than or equal to its boiling point at atmospheric pressure, thereby precipitating crystalline $LiFePO_4$ powder.

An extremely fine 50 to 200 nm particle size is obtained, with a narrow distribution.

In US2004/0175614 A1, a process is disclosed for the manufacture of $LiFePO_4$, comprising the steps of
  providing an equimolar aqueous solution of $Li^{1+}$, $Fe^{3+}$ and $PO_4^{3-}$,
  evaporating the water from the solution, thereby producing a solid mixture,
  decomposing the solid mixture at a temperature below 500° C. to form a pure homogeneous Li and Fe phosphate precursor, and
  annealing the precursor at a temperature of less than 800° C. in a reducing atmosphere, thereby forming a $LiFePO_4$ powder.

The obtained powders have a particle size of less than 1 μm.

In Delacourt et al., Solid State Ionics 173 (2004) 113-118, the thermodynamics and kinetics governing the precipitation of pure powders of phosphates phases for Li batteries are described. Optimized electrodes were synthesized through a chemical conductive carbon coating at the surface of $LiFePO_4$ prepared by evaporation of an $Fe^{III}$-containing aqueous solution.

The disclosed process is aimed at providing a material with a higher conductivity than that of conventional materials, and at solving the monitoring problem of the state of charge.

To this end, a powdered Li insertion/extraction material is disclosed, comprising $Li_x(M,M')PO_4$ as an active component, wherein $0 \leq x \leq 1$, M is one or more cations selected from the group consisting of Mn, Fe, Co, Ni, Cu, and M' is an optional substitutional cation selected from the group consisting of Na, Mg, Ca, Ti, Zr, V, Nb, Cr, Zn, B, Al, Ga, Ge, Sn, characterized in that said material is a single phase material that is thermodynamically stable at 25° C. during Li insertion/extraction, for x varying from less than 0.2 to more than 0.8. In the above formula, M is preferably Fe; moreover, an M to M' molar ratio of more than 5, and preferably of more than 8, is advised. When M is Fe and M/M'>5, then the invented material is typically characterized by a crystallographic cell volume lower than 291 Å$^3$, preferably equal to or lower than 290 Å$^3$, and more preferably equal to or lower than 289 Å$^3$. This volume is deduced from XRD measurements using a Pmna or Pmnb space group.

The invented material is a powder with a preferred particle size distribution with a d50 of less than 50 nm, and preferably between 10 and 50 nm. A d99 of less than 300 nm, and preferably of less than 200 nm is advised. Moreover, a mono-modal particle size distribution where the ratio (d90-d10)/d50 is less than 1.5, preferably less than 1.2, is advised.

Another aspect of the invention concerns a process for the synthesis of the above-described Li$_x$(M,M')PO$_4$ materials. The process comprises the steps of:
- providing a first water-based mixture having a pH between 6 and 10, containing a bipolar (i.e. water miscible) aprotic additive, and Li and P precursors introduced as Li$^{(I)}$ and P$^{(V)}$;
- adding an M precursor as M$^{(II)}$, and an M' precursor, to said first water-based mixture, thereby obtaining a second water-based mixture;
- heating said second water-based mixture to a temperature of less than or equal to its boiling point at atmospheric pressure, thereby precipitating the powdered Li insertion/extraction material.

In a preferred embodiment, Li$^{(I)}$ is introduced as LiOH.H$_2$O, and P$^{(V)}$ as H$_3$PO$_4$. It is advisable to adjust the pH of the first mixture by using a proper ratio of LiOH.H$_2$O and H$_3$PO$_4$. The also process covers the synthesis Li$_x$(M,M')PO$_4$, wherein M=Fe, M' being absent, and wherein the pH of the first water-based mixture is between 6.5 and 8, and preferably between 6.5 and 7.5.

The bipolar aprotic additive is preferably selected and dosed so as to elevate the atmospheric boiling point of the second water-based mixture to between 100 and 150° C., preferably between 105 and 120° C. Dimethylsulfoxide is a preferred additive. The first water-based mixture contains between 5 and 50% mol, and preferably between 10 and 30% mol of dimethylsulfoxide.

In a still preferred embodiment, the precipitating powdered Li insertion/extraction material is subjected to a thermal post-treatment by heating it in non-oxidising conditions, at a temperature of up to 650° C., and preferably of at least 300° C.

In a still preferred embodiment, an electron conducting substance, or its precursor, is added to either one or more of the first water-based mixture, the second water-based mixture, and the powder before the thermal post-treatment. The electronic conducting substance can advantageously be carbon, in particular conductive carbon or carbon fibres, and the precursor of the electron conducting substance can be a carbon-based polymerizable structure.

Another aspect of the invention concerns a secondary Li-based battery, comprising an anode, an electrolyte and a cathode, said cathode comprising the above-described material.

Yet another aspect of the invention concerns an electrode mix for secondary Li-based batteries, comprising the above-described material.

A first embodiment is related to an electrode mix for secondary Li-based batteries with non-aqueous liquid electrolyte, comprising at least 80% wt of the invented material, characterised by a reversible capacity of at least 75% of the theoretical capacity (about 170 mAh/g), when used as an active component in a cathode cycled between 2.5 and 4.5 V vs. Li$^+$/Li at a discharge rate of 0.1 C at 25° C. The amount of additives (binder and carbon) in the electrode mixture can be limited to less than 20% wt, preferably to less than 10% wt, because the mixture, being pasted on a current collector, needs not to be self-supporting for this type of batteries.

A second embodiment is related to an electrode mix for secondary Li-based batteries with non-aqueous gel-like polymer electrolyte, comprising at least 80% wt of the invented material, characterised by a reversible capacity of at least 75% of the theoretical capacity when used as an active component in a cathode cycled between 2.5 and 4.5 V vs. Li$^+$/Li at a discharge rate of 0.1 C at 25° C. The amount of additives in the electrode mixture can be as high as 20% wt in this case, because the mixture, being rolled in the form of a sheet to be laminated to a current collector, needs to be self-supporting during assembly of this type of batteries.

A third embodiment is related to an electrode mix for secondary Li-based batteries with non-aqueous dry polymer electrolyte, comprising at least 70% wt of the invented material, characterised by a reversible capacity of at least 75% of the theoretical capacity, when used as an active component in a cathode cycled between 2.5 and 4.5 V vs. Li$^+$/Li at a discharge rate of 0.1 C at 25° C.

A further embodiment concerns a secondary Li-based battery with an electrode comprising nanometric powdered Li$_x$(M,M')PO$_4$ as an active component, wherein 0≤x≤1, M is one or more cations selected from the group consisting of Mn, Fe, Co, Ni, Cu, and M' is an optional substitutional cation selected from the group consisting of Na, Mg, Ca, Ti, Zr, V, Nb, Cr, Zn, B, Al, Ga, Ge, Sn, characterized in that the contribution of said electrode to the EMF of the battery at 25° C. varies continuously with the state of charge by more than 0.05 V, for x varying from 0.2 to 0.8. In the above formula, M is preferably Fe; moreover, an M to M' molar ratio of more than 5, and preferably of more than 8, is advised. When M is Fe and M/M'>5, then the said nanometric powdered active component is typically characterized by a crystallographic cell volume lower than 291 Å$^3$, preferably equal to or lower than 290 Å$^3$, and more preferably equal to or lower than 289 Å$^3$. This volume is deduced from XRD measurements using a Pnma or Pmnb space group.

By "continuously varying EMF" is meant a continuously sloping charge/discharge voltage curve. This slope, according to the present invention, amounts to at least 5 mV per inserted/extracted Li, and preferably to at least 15 mV per inserted/extracted Li, and this along the complete charge/discharge cycle.

The said nanometric powdered active component has a preferred particle size distribution with a d50 of less than 50 nm, and preferably between 10 and 50 nm. A d99 of less than 300 nm, and preferably of less than 200 nm is advised. Moreover, a mono-modal particle size distribution where the ratio (d90-d10)/d50 is less than 1.5, preferably less than 1.2 is advised.

It should be noted that, in the invented material, M and M' are considered as at least partially interchangeable, whilst however respecting electroneutrality rules assuming Li$^{(I)}$, M$^{(II)}$, M$^{(I)\,to\,(V)}$, and P$^{(V)}$.

Products finer than 10 nm are not particularly advisable, as they could lead to processability problems during electrode manufacturing.

According to the invented process, the first water-based mixture has a pH between 6 and 10, preferably 6 to 8, in order to avoid precipitation of Li$_3$PO$_4$ as impurities.

Use is made of a bipolar additive as a co-solvent that will increase the precipitate nucleation kinetics, and thus reducing the size of the room temperature single phase Li insertion/extraction $Li_xFePO_4$ ($0 \leq x \leq 1$) nanometric particles. In addition to being bipolar, i.e. miscible with water, useful co-solvents should be aprotic, i.e. show only a minor or complete absence of dissociation accompanied by release of hydrogen ions. Co-solvents showing complexation or chelating properties such as ethylene glycol do not appear suitable as they will reduce the kinetics of precipitation of $Li_xMPO_4$ and thus lead to larger particle sizes. Suitable dipolar aprotic solvents are dioxane, tetrahydrofuran, $N$—($C_1$-$C_{18}$-alkyl)pyrrolidone, ethylene glycol dimethyl ether, $C_1$-$C_4$-alkylesters of aliphatic $C_1$-$C_6$-carboxylic acids, $C_1$-$C_6$-dialkyl ethers, N,N-di-($C_1$-$C_4$-alkyl)amides of aliphatic $C_1$-$C_4$-carboxylic acids, sulfolane, 1,3-di-($C_1$-$C_8$-alkyl)-2-imidazolidinone, $N$—($C_1$-$C_8$-alkyl)caprolactam, N,N,N',N'-tetra-($C_1$-$C_8$-alkyl)urea, 1,3-di-($C_1$-$C_8$-alkyl)-3,4,5,6-tetrahydro-2(1H)-pyrimidone, N,N,N',N'-tetra-($C_1$-$C_8$-alkyl)sulfamide, 4-formylmorpholine, 1-formylpiperidine or 1-formylpyrrolidine, in particular $N$—($C_1$-$C_{18}$-alkyl)pyrrolidone, N,N-di-($C_1$-$C_4$-alkyl)amide of aliphatic $C_1$-$C_4$-carboxylic acids, 4-formylmorpholine, 1-formylpiperidine or 1-formylpyrrolidine, preferably N-methylpyrrolidone (NMP), N-octylpyrrolidone, N-dodecylpyrrolidone, N,N-dimethylformamide, N,N-dimethylacetamide, 4-formylmorpholine, 1-formylpiperidine or 1-formylpyrrolidine, particularly preferably N-methylpyrrolidone, N,N-dimethylformamide, N,N-dimethylacetamide or hexamethylphosphoramide. Other alternatives such as tetraalkyl ureas are also possible. Mixtures of the above-mentioned dipolar aprotic solvents may also be used. In a preferred embodiment, dimethylsulfoxide (DMSO) is used as solvent.

It cannot be excluded that the novel room temperature single phase insertion/extraction material could lead to a two-phase system at temperatures well below 25° C., such as below 10° C. This phase transition should however be reversible. Its effect should therefore only minimally affect the operation of batteries in most practical circumstances.

The disclosed process leads to an initial material that may contain traces of $Fe^{(III)}$. Due to the nanometric particle size, some $Fe^{(III)}$ could arise from a deviation from stoichiometry at the surface of the material. The presence of $Fe^{(III)}$ could also be due to a second amorphous phase, most likely $LiFePO_4(OH)$ or $FePO_4 \cdot nH_2O$, at the surface of the crystals or at grain boundaries. The skilled person may minimize the $Fe^{(III)}$ by working under reducing atmosphere or by relying on reducing agents such as hydrazine or $SO_2$. The possible Li deficit in the initial material could moreover be compensated during the first full discharge cycle of the battery if the environment is able to provide the necessary Li (as it is likely the case in many practical batteries).

Compared to state of the art $LiFePO_4$ materials, the advantages of the invented material are:
- a sloping charge/discharge curve, allowing direct monitoring of the state of charge by simple potential measurement;
- a nanometric particles size, which alleviates kinetic limitations due to Li ion transport within the particles, and allows fast charge/discharge of the battery;
- a narrow particle size distribution, ensuring a homogeneous current distribution within the battery; this is again especially important at high charge/discharge rates, where finer particles would get more depleted than coarser ones, a phenomenon leading to the eventual deterioration of the particles and to the fading of the battery capacity upon use; a narrow particle size distribution furthermore facilitates the manufacture of electrodes;
- the coexistence of mixed valence state for Fe (i.e. $Fe^{(III)}/Fe^{(II)}$), which is believed to increase the electronic conductivity of the room temperature single phase $Li_xFePO_4$ material compared to state of the art two-phase materials, represented as $(1-x)FePO_4 + xLiFePO_4$ ($0 \leq x \leq 1$).

EXAMPLE

The invention is further illustrated in the following example.

In a first step, DMSO is added to a solution of 0.1 M $H_3PO_4$, diluted in $H_2O$ under stirring. The amount of DMSO is adjusted in order to reach a global composition of 50% vol. water and 50% vol. DMSO.

In a second step, an aqueous solution of 0.3M $LiOH \cdot H_2O$ is added at 25° C. in a quantity so as to increase the pH up to a value between 6.5 and 7.5, and leading to the precipitation of $Li_3PO_4$.

In a third step, a solution of 0.1M Fe(II) in FeSO$_4$.7H$_2$O is added at 25° C. This is believed to lead to the re-dissolution of Li$_3$PO$_4$. The final Li:Fe:P ratio in the solution is close to 3:1:1. By adding the Fe(II) precursor after the pH of the solution has been set at a certain value between 6.5 and 7.5, it is possible to perform a controlled precipitation of Fe-species resulting in much lower particle sizes than obtained in the prior art.

In a fourth step, the temperature of the solution is increased up to the solvent boiling point, which is 108 to 110° C. After 6 h, the obtained precipitate is filtered and washed thoroughly with water.

Figure 2:
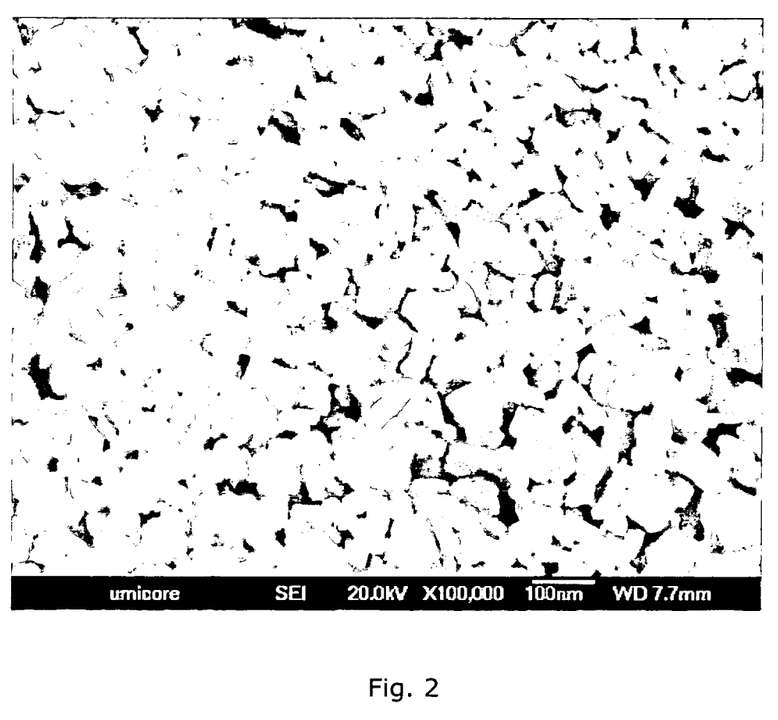
FIG. 2: FEG-SEM picture of product of the Example, showing the small particle size and the sharp particle size distribution.
Figure 3:
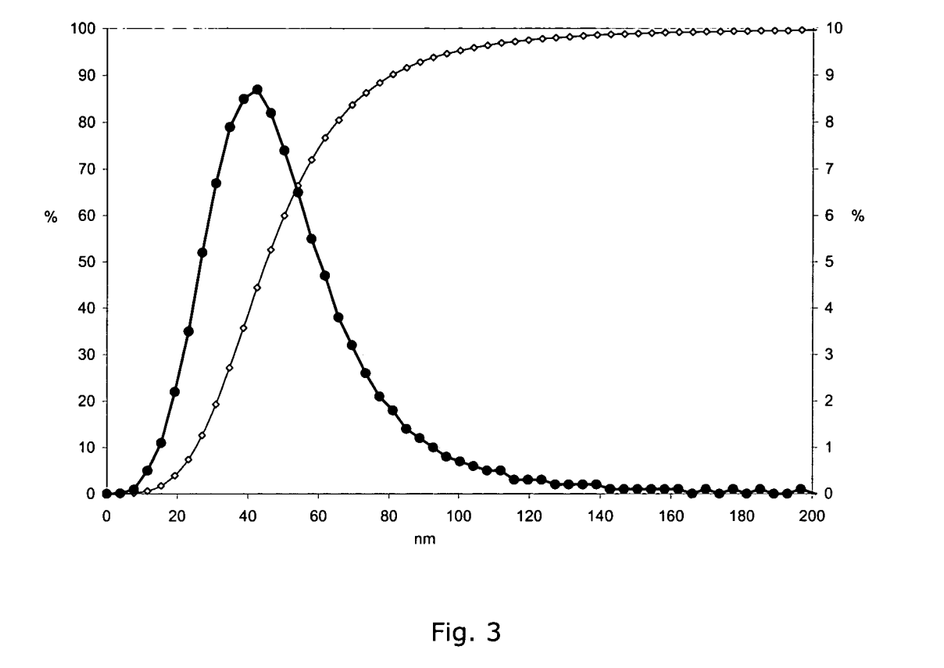
FIG. 3: Volumetric particle size distribution and cumulative distribution (% vs. nm) for the product of the Example showing d50 values about 45 nm, while the relative span, defined as (d90-d10)/d50, is about 1.2 (d10=25 nm, d90=79 nm).

The powdery precipitate is pure crystalline LiFePO$_4$, according to XRD measurements. The full pattern matching refinement done on XRD pattern (Pmnb space group) leads to cell parameters a=10.294 Å, b=5.964 Å and c=4.703 Å, corresponding to a crystallographic cell volume of 288.7 Å$^3$. The FEG-SEM picture on FIG. 2 shows monodisperse small crystalline particles in the 30 to 60 nm range. The volumetric particle size distribution of the product was measured by using image analysis. As shown in FIG. 3, the d50 values is about 45 nm, while the relative span, defined as (d90-d10)/d50, is about 1.2 (d10=25 nm, d90=79 nm).

Figure 1:
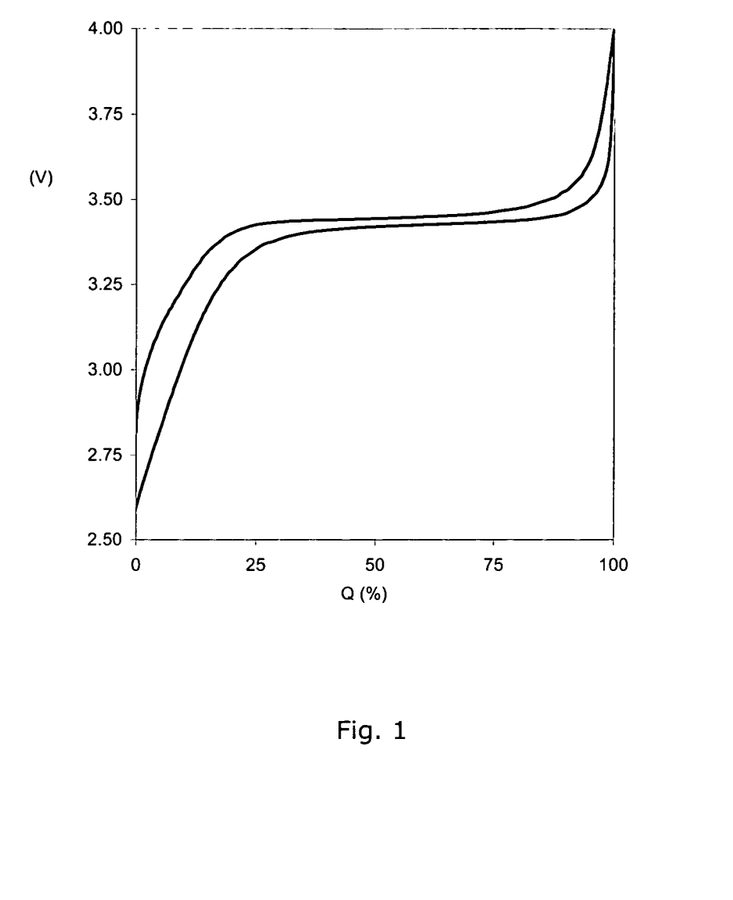
FIG. 1: Galvanostatic charge/discharge curve of the invented material at 25° C. and C/20 rate, showing a sloping voltage curve. The plot shows the voltage of the battery as a function of the normalized capacity; 0% state of charge (SOC) corresponds to starting $LiFePO_4$ material, while 100 corresponds to charged delithiated $FePO_4$ material.

A slurry is prepared by mixing the LiFePO$_4$ powder obtained with the process described above with 10% wt carbon black and 10% wt PVDF into N-Methyl Pyrrolidone (NMP) and deposited on an Al foil as current collector. The obtained electrode containing 80% wt active material is used to manufacture coin cells, using a loading of 6 mg/cm$^2$ active material. The negative electrodes are made of metallic Li. The coin cells are cycled in LiBF$_4$ based electrolyte between 2.5 and 4.0 V. FIG. 1 shows that high reversible capacity is obtained at low rate with a sloping voltage curve upon cycling characteristic of a single phase Li insertion/extraction mechanism. It should be emphasised that the curve of FIG. 1 has been recorded in galvanostatic conditions, and, as such, only approximates the EMF of the electrode. The EMF is in this case varying continuously as a function of Li insertion/extraction; the slope of the EMF curve is thus definitely non-zero, although it might be slightly less pronounced than in the figure.

Figure 4:
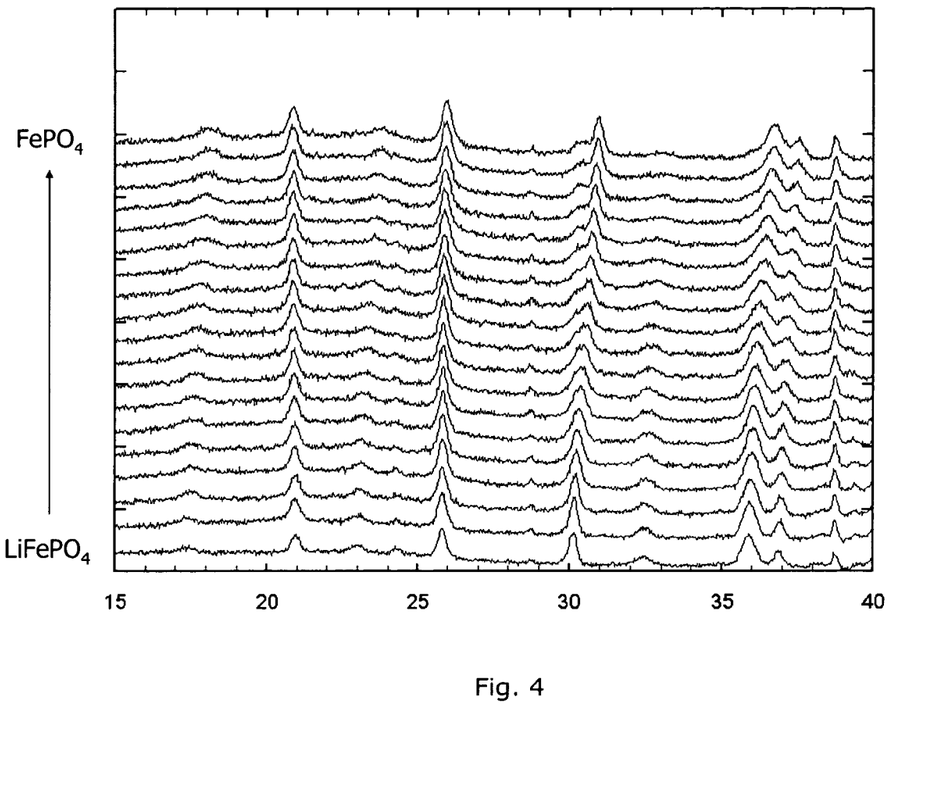
FIG. 4: In situ XRD recorded at different states of charge and at 25° C. for invented material; 0% state of charge (SOC) corresponds to starting $LiFePO_4$ material, while 100% corresponds to charged delithiated $FePO_4$ material
Figure 5:
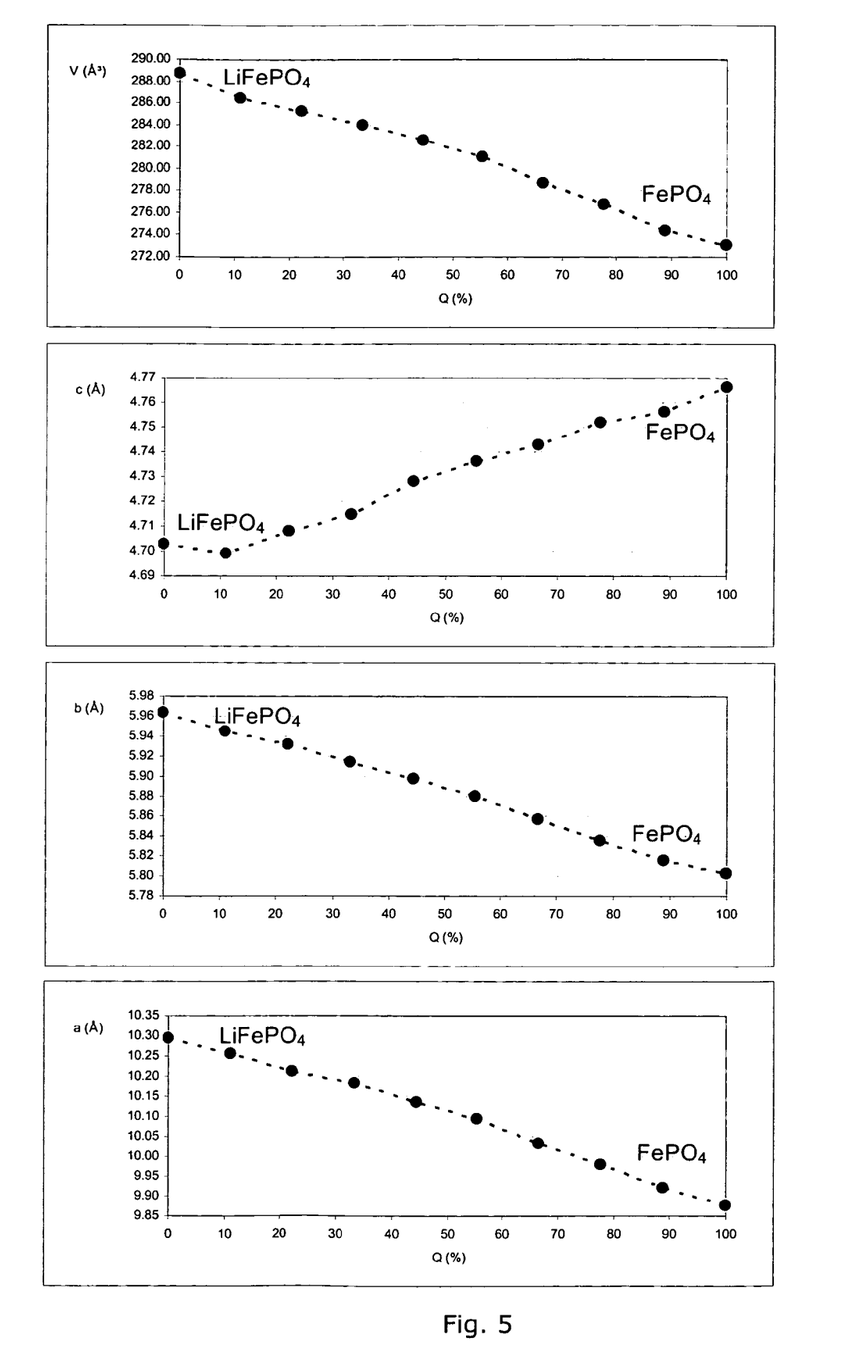
FIG. 5: Evolution with composition of the cell parameters for $Li_xFePO_4$ ($0 \leq x \leq 1$) calculated from the in situ XRD recorded at measured at 25° C. at different states of charge. This clearly shows a continuous solid solution between $LiFePO_4$ and $FePO_4$ with continuous variation between the limiting values of the cell parameters as the lithium concentration varies from 1 to 0.

FIG. 4 shows in situ XRD data collected in the battery upon cycling. It is clearly visible on FIG. 5 that the insertion/extraction proceeds from LiFePO$_4$ to FePO$_4$ with a continuous evolution of the cell parameters, which evidences the presence of a single Li$_x$FePO$_4$ (0≤x≤1) phase. It also emphasizes the good reversibility of this single phase mechanism upon cycling.

Counter Example

As a counter example, materials are synthesised according to the example illustrating WO2007/000251. Compared to the example according to the invention, one notes that the order of addition of the reactants is different; this change is of crucial importance with respect to the final particle size of the precipitated material, this latter being about 130 to 150 nm for product precipitated according to the mentioned prior art. It is understood that the difference between the present invention and this prior art lies in the fact that the Fe-precursor is added to a solution having already a fixed and stable pH, between 6.5 and 7.5; whilst in the prior art the Fe-precursor is added to a solution having a pH of less than 6, whereafter the addition of the Li-precursor raised the pH to around 7. The Fe-precursor can also be added in a solid form.

Also, the obtained counter example material, as characterized by Rietveld refinement from XRD pattern, shows a crystallographic cell volume of 291.7 Å$^3$.

Figure 6:
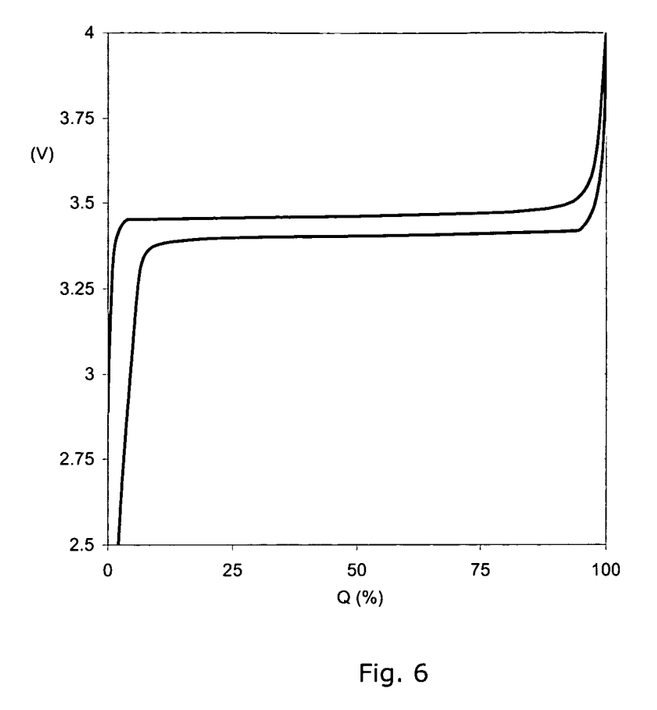
FIG. 6: Galvanostatic charge/discharge curve of state of the art material at 25° C. and C/20 rate, showing the constant voltage curve. The plot shows the voltage of the battery as a function of the normalized capacity; 0% state of charge (SOC) corresponds to starting $LiFePO_4$ material, while 100% corresponds to charged delithiated $FePO_4$ material.

With his material, batteries are prepared as described above. FIG. 6 shows the charge/discharge curve of the prior art material at room temperature and C/20 cycling rate. There is a constant voltage plateau, which is characteristic of a two-phase Li insertion/extraction mechanism. It should be emphasised that the curve of FIG. 6 has been recorded in galvanostatic conditions, and, as such, only approximates the EMF of the cell. The EMF is in this case constant, the slope of the EMF as a function of Li insertion/extraction being essentially zero.

Figure 7:
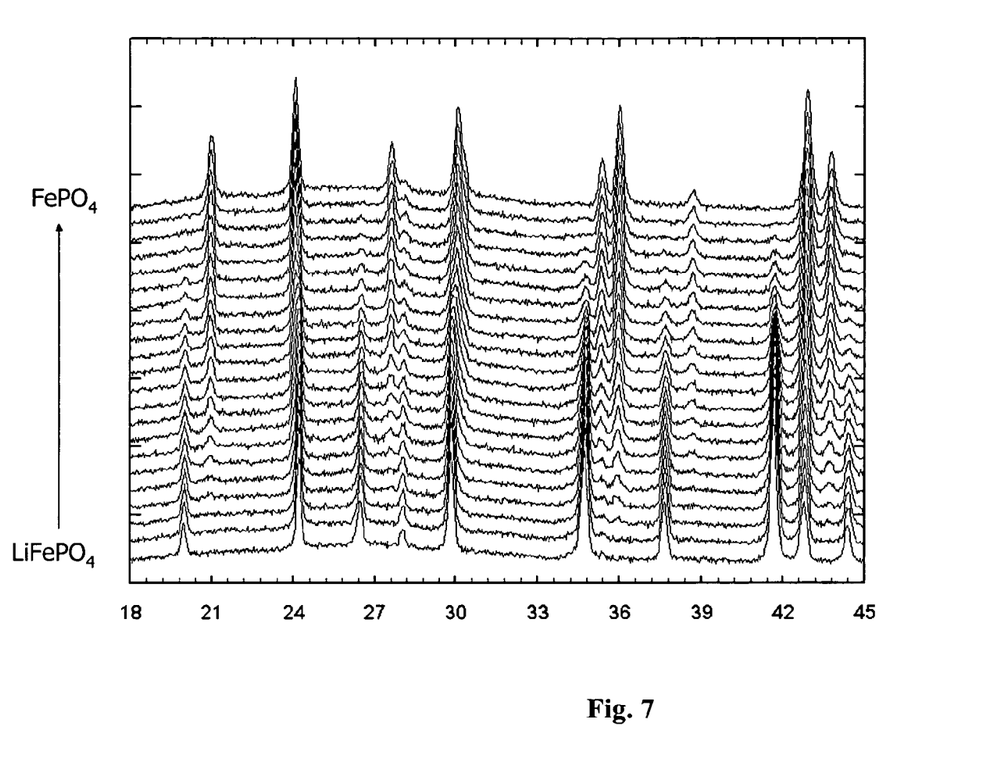
FIG. 7: in situ XRD recorded at different states of charge for state of the art products; 0% state of charge (SOC) corresponds to starting $LiFePO_4$ material, while 100% corresponds to charged delithiated $FePO_4$ material.
Figure 8:
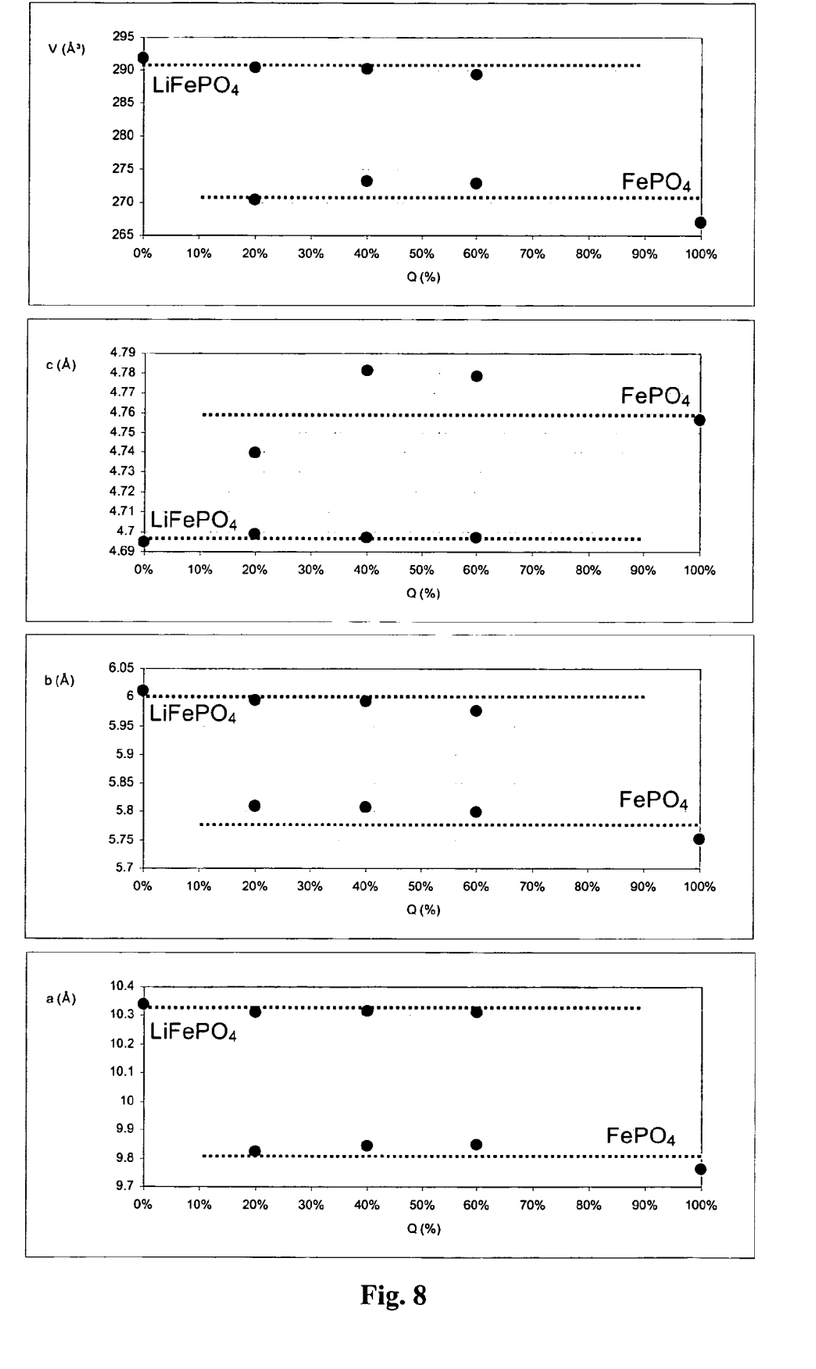
FIG. 8: Evolution with composition of the cell parameters for $(1-x)FePO_4 + xLiFePO_4$ ($0 \leq x \leq 1$) calculated from the in situ XRD recorded at different states of charge. This clearly shows a classical two-phase system, the proportion of each end member varying with the lithium concentration in the material.

FIG. 7 shows in situ XRD recorded at different state of charge/discharge. The evolution of the cell parameters is illustrated in FIG. 8. This clearly shows a classical two-phase system, the proportion of each end member FePO$_4$ and LiFePO$_4$ varying with the lithium concentration in the material, as opposed to the product according to the invention.

The invention claimed is:

1. A Li insertion/extraction powdered material comprising Li$_x$(M,M')PO$_4$ as an active component, wherein 0≤x≤1, M is one or more cations selected from the group consisting of Mn, Fe, Co, Ni, and Cu, and M' is an optional substitutional cation selected from the group consisting of Na, Mg, Ca, Ti, Zr, V, Nb, Cr, Zn, B, Al, Ga, Ge, and Sn, wherein during discharging and charging of the active component, said active component is and remains a single phase material that is thermodynamically stable at 25° C. for all values of x varying from less than 0.2 to more than 0.8.

2. The powdered material of claim 1, wherein M is Fe.

3. The powdered material of claim 2, having a crystallographic cell volume lower than 291 Å$^3$.

4. The powdered material of claim 1, wherein the M to M' molar ratio is more than 5.

5. The powdered material of claim 1, having a particle size distribution with a d50 of less than 50 nm.

6. The powdered material of claim 1, having a particle size distribution with a d99 of less than 300 nm.

7. The powdered material of claim 1, having a mono-modal particle size distribution where the ratio (d90-d10)/d50 is less than 1.5.

8. A secondary Li-based battery, comprising an anode, an electrolyte and a cathode, said cathode comprising the powdered material of claim 1.

9. An electrode mix for secondary Li-based batteries, comprising the material of claim 1.

10. An electrode mix for secondary Li-based batteries with a non-aqueous liquid electrolyte, comprising at least 80% wt of the powdered material of claim 1, having a reversible capacity of at least 75% of the theoretical capacity, when used as an active component in a cathode cycled between 2.5 and 4.5 V vs. Li$^+$/Li at a discharge rate of 0.1 C at 25° C.

11. An electrode mix for secondary Li-based batteries with a non-aqueous gel-like polymer electrolyte, comprising at least 80% wt of the powdered material of claim 1, having a reversible capacity of at least 75% of the theoretical capacity, when used as an active component ina cathode cycled between 2.5 and 4.5 V vs. Li$^+$/Li at a discharge rate of 0.1 C at 25° C.

12. An electrode mix for secondary Li-based batteries with a non-aqueous dry polymer electrolyte, comprising at least 70% wt of the powdered material of claim 1, having a reversible capacity of at least 75% of the theoretical capacity, when used as an active component in a cathode cycled between 2.5 and 4.5 V vs. Li$^+$/Li at a discharge rate of 0.1 C at 25° C.

13. A secondary Li-based battery with an electrode comprising a nanometric powdered $Li_x(M,M')PO_4$ as an active component, wherein $0 \leq x \leq 1$, M is one or more cations selected from the group consisting of Mn, Fe, Co, Ni, and Cu, and M' is an optional substitutional cation selected from the group consisting of Na, Mg, Ca, Ti, Zr, V, Nb, Cr, Zn, B, Al, Ga, Ge, and Sn, wherein during discharging and charging of the active component, the contribution of said electrode to the EMF of the battery at 25° C. varies continuously with the state of charge by more than 0.05 V, for all values of x varying from 0.2 to 0.8.

14. The secondary battery of claim 13, wherein the M to M' molar ratio is more than 5.

15. The secondary battery of claim 14, wherein M is Fe, and M' is absent.

16. The secondary battery of claim 13, wherein the nanometric powdered active component has a particle size distribution with a d50 of less than 50 nm.

\* \* \* \* \*

UNITED STATES PATENT AND TRADEMARK OFFICE
CERTIFICATE OF CORRECTION

PATENT NO. : 8,641,921 B2
APPLICATION NO. : 12/530846
DATED : February 4, 2014
INVENTOR(S) : Gibot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this
Twenty-second Day of September, 2015

Michelle K. Lee
*Director of the United States Patent and Trademark Office*